United States Patent [19]

Kido

[11] Patent Number: 4,603,552
[45] Date of Patent: Aug. 5, 1986

[54] SAFETY DEVICE FOR TURBOCHARGED ENGINE

[75] Inventor: Yoshinobu Kido, Hiroshima, Japan

[73] Assignee: Toyo Kogyo Co., Ltd., Hiroshima, Japan

[21] Appl. No.: 585,006

[22] Filed: Mar. 1, 1984

[30] Foreign Application Priority Data

Mar. 2, 1983 [JP] Japan .................................. 58-34816

[51] Int. Cl.$^4$ .............................................. F02B 37/00
[52] U.S. Cl. ................................. 60/605; 123/198 D; 123/198 DB
[58] Field of Search ................. 60/600, 601, 602, 603, 60/605; 123/198 D, 198 DB

[56] References Cited

U.S. PATENT DOCUMENTS

| 4,044,560 | 8/1977 | Dorsch et al. | 60/601 |
| 4,429,670 | 2/1984 | Ulanet | 123/198 D |
| 4,470,390 | 9/1984 | Omori et al. | 123/198 D |
| 4,498,443 | 2/1985 | Hasegawa et al. | 60/605 |
| 4,531,493 | 7/1985 | Fortnagel | 123/198 D X |

FOREIGN PATENT DOCUMENTS

| 64794 | 11/1982 | European Pat. Off. | 123/198 DB |
| 32926 | 2/1983 | Japan | 123/198 D |
| 1277020 | 6/1972 | United Kingdom | 60/605 |
| 875112 | 10/1981 | U.S.S.R. | 123/198 D |

*Primary Examiner*—Michael Koczo
*Attorney, Agent, or Firm*—Gerald J. Ferguson, Jr.; Michael P. Hoffman; James E. Bryan

[57] ABSTRACT

In a turbocharged engine, a pressure sensor is disposed downstream of the blower of the turbocharger and protective devices such as an alarm lamp for requiring the operator to lower the supercharging pressure and means for interrupting fuel feed to the engine are actuated under the control of a control circuit, when the supercharging pressure detected by the pressure sensor exceeds a preset maximum supercharging pressure. The control circuit does not permit the protective devices to operate unless the detected supercharging pressure continues higher than the preset maximum supercharging pressure for a predetermined time interval.

13 Claims, 6 Drawing Figures

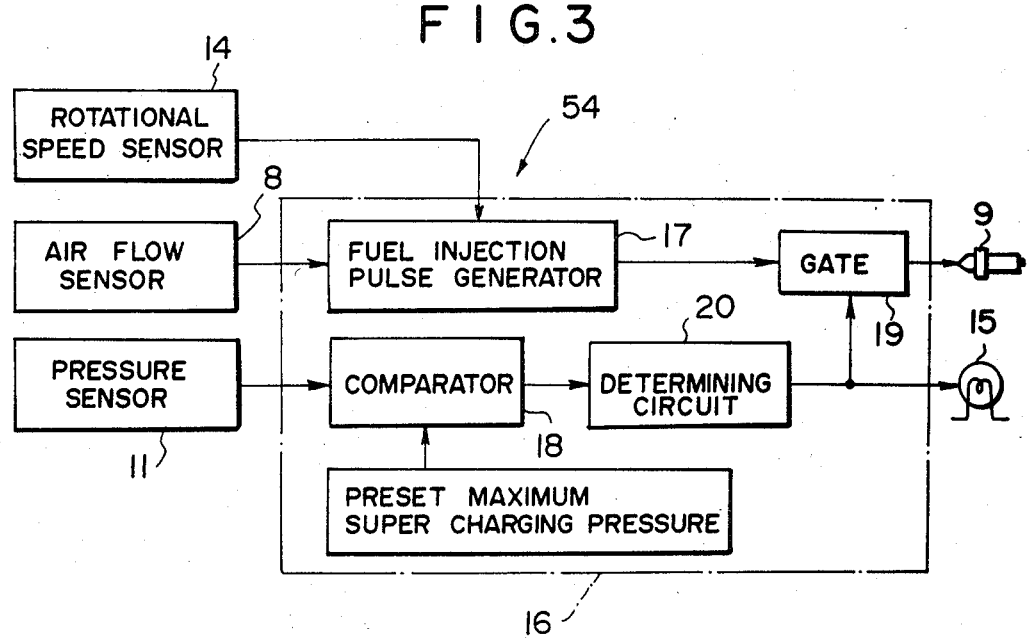
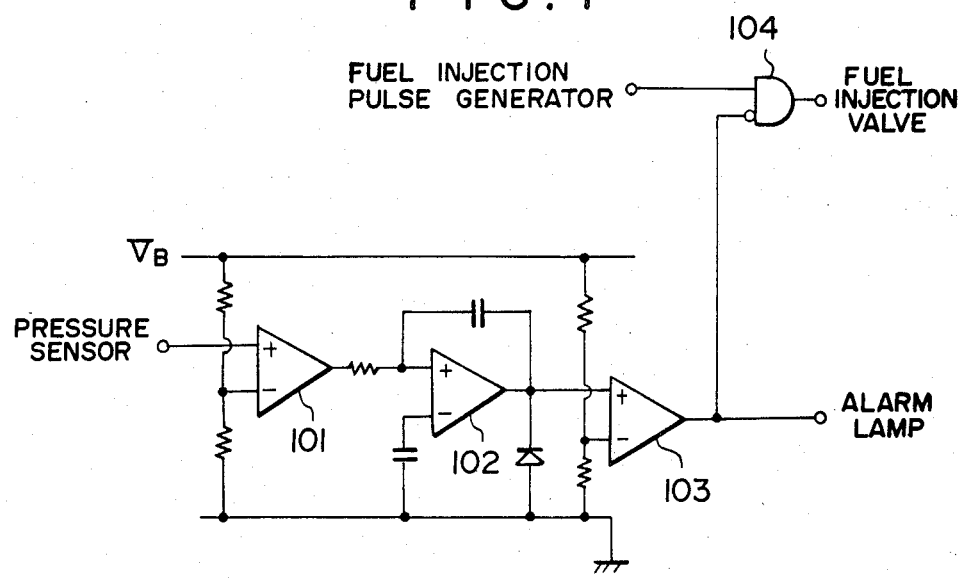

SAFETY DEVICE FOR TURBOCHARGED ENGINE

BACKGROUND OF THE INVENTION

1. Field of the Invention

This invention relates to a safety device for a turbocharged engine, and more particularly to a safety device for a turbocharged engine which is provided with a turbocharger comprising a turbine disposed in the exhaust passage and a blower disposed in the intake passage and connected with the turbine by way of a rotary shaft and in which the throttle valve is disposed in the intake passage downstream of the blower.

2. Description of the Prior Art

In turbocharged engines, the volumetric efficiency is increased and the power output performance of the engine is improved as the supercharging pressure is increased. However, if the supercharging pressure is excessively increased, the durability of the engine is adversely affected. Therefore, protective devices must be provided to limit the supercharging pressure to a maximum value which should be determined taking into account both the power output performance and the durability of the engine. For example, there has been proposed, in Japanese Unexamined Patent Publication No. 57(1982)-122142, a technical concept in which fuel feed to the engine is interrupted to reduce the rotational speed of the engine when the supercharging pressure detected by a pressure sensor exceeds a preset maximum value, thereby limiting the supercharging pressure to the preset maximum value.

However, when the protective devices such as the means for interrupting fuel feed or alarm devices are actuated every time the detected supercharging pressure exceeds the preset maximum value without taking into account the actual operating condition of the engine, there arises a problem that the protective devices are actuated even when the supercharging pressure need not be lowered, thereby adversely affecting the power output performance of the engine and burdening the operator. This is because although it is necessary to actuate the protective devices to lower the supercharging pressure when the detected supercharging pressure continues to be higher than the preset maximum value for a certain time interval, the supercharging pressure need not be lowered when the detected supercharging pressure only temporarily exceeds the preset maximum value since temporary excessive supercharging pressure does not adversely affect the durability of the engine. The supercharging pressure and accordingly the detected supercharged pressure may well temporarily exceed the preset maximum value depending on the operating condition of the engine. For example, in a turbocharged engine in which the throttle valve is disposed in the intake passage downstream of the blower of the turbocharger and the pressure sensor is disposed between the blower and the throttle valve, the detected supercharging pressure can temporarily exceed the preset maximum value when the engine which has been stabilized at a high speed is abruptly decelerated since in such an operating condition the supercharging pressure between the blower and the throttle valve may be raised over the preset maximum value for a short time as shown in FIG. 1 because the blower continues to rotate under the inertial force for a short time after the throttle valve is closed.

On the other hand, in a turbocharged engine in which the throttle valve is disposed in the intake passage downstream of the blower and the pressure sensor is disposed downstream of the throttle valve, the detected supercharging pressure can temporarily exceed the preset maximum value when the throttle valve is opened to accelerate the engine again after abrupt deceleration which leads to the excessive supercharging pressure between the throttle valve and the blower described above since the excessive supercharging pressure flows through the throttle valve and is detected by the pressure sensor disposed downstream of the throttle valve.

Therefore, if the turbocharged engine system is arranged so that fuel feed to the engine is interrupted even when the detected supercharging pressure only temporarily exceeds the preset maximum value, there arises a significant problem regarding the power output performance of the engine that the accelerating response is lowered. For example, when the vehicle speed is abruptly decelerated by braking and shift-down during high speed travel to turn a corner and then the accelerator pedal is depressed to accelerate the vehicle again after rounding the corner, the rotational speed of the engine cannot be smoothly accelerated to the desired speed since the detected supercharging pressure detected by the sensor disposed between the throttle valve and the blower or downstream of the throttle valve has temporarily exceeded the preset maximum value upon the abrupt deceleration or immediately after the throttle valve is opened as described above and fuel feed is temporarily interrupted.

In the case that the protective device is in the form of an alarm system such as an alarm lamp or buzzer warning the operator to lower the supercharging pressure, for instance, by decelerating the vehicle, the operator is needlessly burdened and is forced into carrying out a needless operation if the alarm lamp or the alarm buzzer is actuated when the supercharging pressure need not be lowered, whereby his attention is distracted from his driving.

SUMMARY OF THE INVENTION

In view of the foregoing observations and description, the primary object of the present invention is to provide a safety device for a turbocharged engine in which the protective devices such as the fuel feed interrupting device or the alarm device are prevented from being needlessly actuated and accordingly which can improve the power output performance of the turbocharged engine and the drivability in case that the engine is mounted on a vehicle.

The safety device for a turbocharged engine in accordance with the present invention comprises a pressure sensor for detecting the supercharging pressure downstream of the blower of the turbocharger, i.e., the pressure between the blower and the throttle valve or downstream of the throttle valve, and a control circuit which actuates a protective devices such as a fuel feed interruption device or an alarm system when the detected supercharging pressure continues to be higher than the preset maximum value for a predetermined time interval.

BRIEF DESCRIPTION OF THE DRAWINGS

FIG. 3 is a block diagram of the safety device employed in the engine shown in FIG. 2, FIG. 4 is an example of concrete circuitry for the control circuit employed in the safety device of FIG. 3.

DESCRIPTION OF THE PREFERRED EMBODIMENTS

Figure 1:
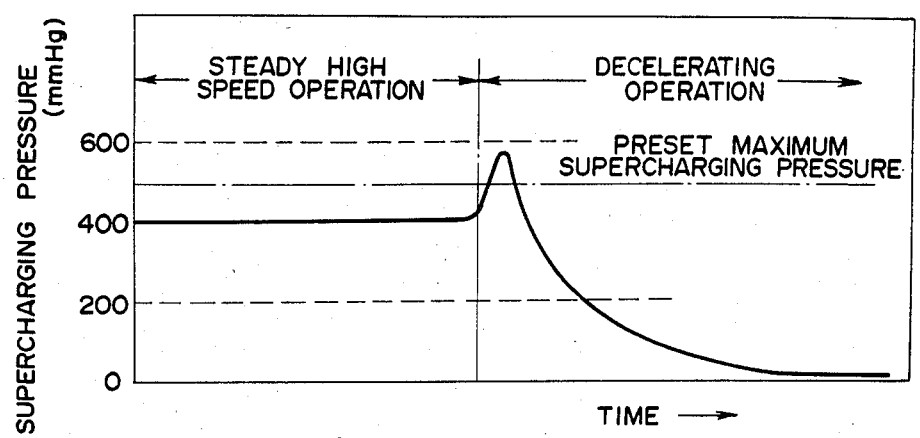
FIG. 1 shows the change in detected supercharging pressure according to change in the operating condition of a turbocharged engine.
Figure 2:
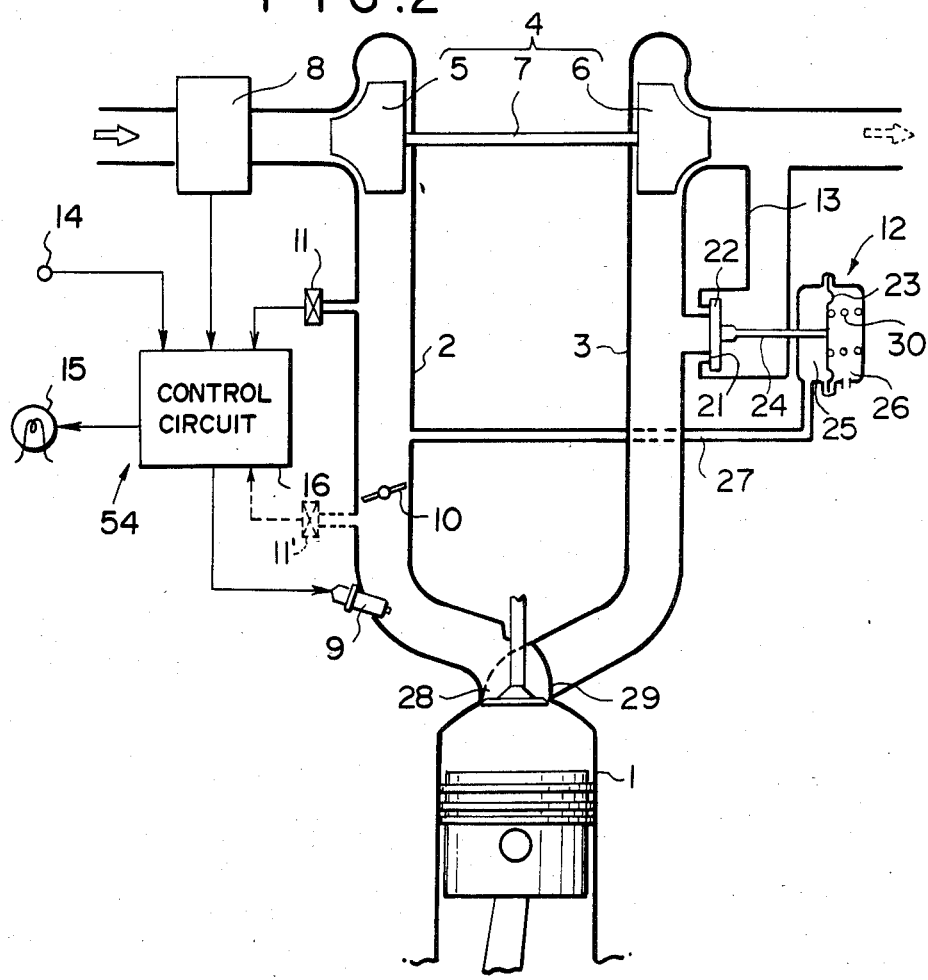
FIG. 2 is a schematic views showing a turbocharged engine employing a safety device in accordance with an embodiment of the present invention.

In FIG. 2, which schematically shows a turbocharged engine 1 for a vehicle employing a safety device 54 in accordance with an embodiment of the present invention, the engine 1 is provided with an intake passage 2 and an exhaust passage 3. An air flow sensor 8 for measuring flow of intake air is disposed upstream of the intake passage 2 and a throttle valve 10 is disposed in the intake passage 2 near an intake port 28 of the engine 1. A fuel injection valve 9 is provided in the intake passage 2 between the throttle valve 10 and the intake port 28. A blower 5 of a turbocharger 4 is disposed between the air flow sensor 8 and the throttle valve 10 in the intake passage 2. The intake passage 2 is further provided with a pressure sensor 11 between the blower 5 and the throttle valve 10 for detecting the supercharging pressure downstream of the blower 5.

In the exhaust passage 3 is mounted a turbine 6 of the turbocharger 4 which is connected with the blower 5 by way of a rotary shaft 7. The exhaust passage 3 is further provided with a bypass passage 13 bypassing the turbine 6 of the turbocharger 4. The bypassing passage 13 is provided with a waste gate valve 12 for bypassing a part of the exhaust gas discharged from an exhaust port 29 of the engine 1 to control the rotational speed of the turbine 6 according to the pressure between the blower 5 and the throttle valve 10 as described in detail hereinbelow. The waste gate valve 12 comprises a valve body 22 which can be brought into engagement with a valve seat 21 provided in the bypass passage 13 and can be moved away therefrom to close and open the bypass passage 13. The valve body 22 is fixed to one end of a rod 24 the other end of which is connected to a diaphragm 23. An atmospheric pressure chamber 26 and a positive pressure chamber 25 are defined on opposite sides of the diaphragm 23. The atmospheric pressure chamber 26 opens to the atmosphere and is provided with a coil spring 30 for urging the diaphragm 23 toward the positive pressure chamber 25, thereby urging the valve body 22 toward the valve seat 21 by way of the rod 24. The positive pressure chamber 25 is communicated with the intake passage 2 by way of an intake pressure introduction passage 27. The diaphragm 23 is moved depending on the difference between the force of the coil spring 30 in the atmospheric pressure chamber 26 and the pressure in the positive pressure chamber 25 to move the valve body 22 toward and away from the valve seat 21, thereby close and open the waste gate valve 12. The force of the coil spring 30 is selected according to the intake pressure corresponding to the target supercharging pressure which is the working supercharging pressure during steady high speed operation of the engine and is set at a pressure lower than a preset maximum supercharging pressure by an appropriate value, and when the intake pressure introduced into the positive pressure chamber 25 overcomes the force of the coil spring 30, the waste gate valve 12 opens the bypass passage 13 to permit a part of the exhaust gas from the engine 1 to flow therethrough bypassing the turbine 6, thereby controlling rotation of the turbine 6 to prevent the supercharging pressure from being excessively increased and to converge the same to the target supercharging pressure.

While the waste gate valve 12 is working normally, the supercharging pressure cannot exceed the target supercharging pressure set by the waste gate valve 12. However, when the waste gate valve 12 malfunctions, the supercharging pressure can exceed the target supercharging pressure and reach the preset maximum supercharging pressure which is determined in view of the durability of the engine. Said safety device 54 actuates protective devices when the detected supercharging pressure detected by the pressure sensor 11 is higher than the preset maximum supercharging pressure for a predetermined time interval to lower the supercharging pressure below the preset maximum supercharging pressure.

The safety device 54 comprising a control circuit 16 which receives control signals respectively outputted from the pressure sensor 11 according to the detected supercharging pressure, from the air flow sensor 8 according to the amount of intake air and from a rotational speed sensor 14, mounted for instance on the flywheel of the engine 1, according to the rotational speed of the engine 1, and controls both the fuel injection valve 9 and an alarm lamp 15.

The control circuit 16 comprises, as shown in FIG. 3, a fuel injection pulse generator 17 which determines the opening time of the fuel injection valve 9, i.e., the amount of fuel to be injected, a gate circuit 19 for interrupting fuel injection from the fuel injection valve 9 according to the detected supercharging pressure, a comparator 18 which compares the detected supercharging pressure with the preset maximum supercharging pressure and a determining circuit 20 which determines whether or not fuel injection is to be interrupted and the alarm lamp 15 is to be lit, according to the duration of the detected supercharging pressure higher than the preset maximum supercharging pressure and controls the gate circuit 19 and the alarm lamp 15. The determining circuit 20 determines that the protective devices, i.e., the gate circuit 19 for interrupting fuel injection and the alarm lamp 15 in this particular embodiment, need not be actuated when the detected supercharging pressure detected by the pressure sensor 11 is lower than the preset maximum supercharging pressure or when, though having once exceeded the preset maximum supercharging pressure, the detected supercharging pressure again falls below the same within a predetermined time interval, and permits fuel injection from the fuel injection valve 9 under the control of the fuel injection pulse from the fuel injection pulse generator 17. On the other hand, when the detected supercharging pressure continues higher than the preset maximum supercharging pressure for the predetermined time interval, the determining circuit 20 determines that the protective devices are to be actuated to lower the supercharging pressure and actuates the gate circuit 19 to interrupt fuel injection and the alarm lamp 15 to warn the operator of the abnormally high supercharging pressure and to instruct the operator to take steps to lower the supercharging pressure, e.g., by decelerating of the vehicle.

FIG. 4 shows an example of concrete circuitry of the control circuit 16. In this example, the output of the pressure sensor 11 is connected to the positive input of a comparator 101 corresponding to the comparator 18 in the block diagram of FIG. 3. The negative input of the comparator 101 is connected to a supply voltage $V_B$ so that a reference voltage representing the preset maximum supercharging pressure is applied to the negative input. The determining circuit 20 is formed of an integrating circuit 102 which integrates the output of the comparator 101 and a comparator 103 which compares the output of the integrating circuit 102 with a predetermined threshold level. The output of the comparator 103 is fed to the alarm lamp 15 and fed to one input of an AND gate 104 (corresponding to the gate circuit 19) after being inverted. The other input of the AND gate 104 is connected to the fuel injection pulse generator 17. The comparator 101 outputs "1" when the output signal of the pressure sensor 11 is higher than the reference voltage applied to the negative input thereof and outputs "0" when the former is lower than the latter. The integrating circuit 102 outputs the integrated value of the output signal of the comparator 101. The comparator 103 compares the output signal of the integrating circuit 102 with the predetermined threshold level and outputs "1" when the output signal of the integrating circuit 102 becomes higher than the threshold level. The output signal of the comparator 103 is inverted and fed to the AND gate 104. In other words, when the output signal of the comparator 103 is "1", i.e., when the integrated value of the output signal of the comparator 101 is higher than the predetermined threshold level, the AND gate 104 prevents the fuel injection pulse generated by the fuel injection pulse generator 17 from being fed to the fuel injection valve 9, thereby interrupting fuel feed to the engine 1. At the same time, the output signal of the comparator 103 is fed to the alarm lamp 15 to light it. So long as the integrated value of the output signal of the comparator 101 is lower than the threshold level, the AND circuit permits fuel injection from the fuel injection valve 9 and the alarm lamp 15 is not lit, i.e., the protective devices are not actuated. Thus, even if the detected supercharging pressure becomes higher than the preset maximum supercharging pressure represented by the reference voltage at the negative input of the comparator 101, the protective devices are not actuated unless the detected supercharging pressure continues to be higher than the preset maximum supercharging pressure for the time interval required by the integrated value of the output signal of the comparator 101 to reach the predetermined threshold level. Of course, when the detected supercharging pressure is lower than the preset maximum supercharging pressure, the integrated value of the output signal of the comparator 101 cannot reach the threshold level and therefore the protective devices are not actuated.

Figure 5:
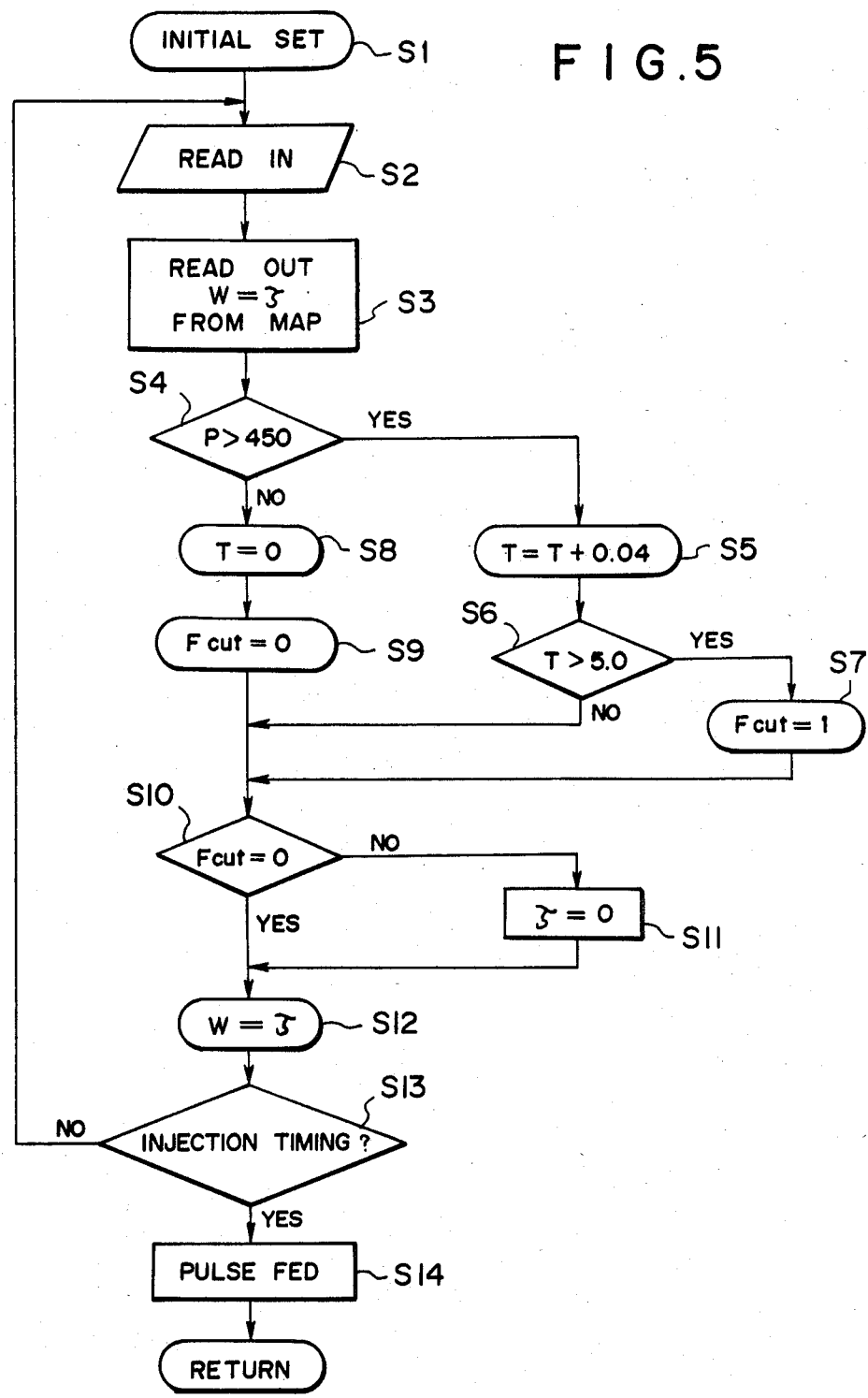
FIG. 5 shows an example of a flow chart for the operations to be carried out by the CPU of a microcomputer when a microcomputer is used as the control circuit shown in FIG. 3.

The control circuit 16 may be a microcomputer. FIG. 5 shows an example of a flow chart of the operations to be carried out by the CPU of the microcomputer.

In step S1, timer T is set at 0 (T=0) and flag Fcut is set at 0 (Fcut=0), flag Fcut=0 representing that fuel may be injected and flag Fcut=1 representing that fuel should not be injected.

In step S2, the outputs of the air flow sensor 8, pressure sensor 11 and engine rotational speed sensor 14 are read in. Then in step S3, the amount of fuel to be injected or the width W of the fuel injection pulse to be generated is determined (W=$\tau$).

In step S4, whether or not the detected supercharging pressure P is higher than the preset maximum supercharging pressure, e.g., 450 mmHg, is determined. If YES, the CPU proceeds to step S5 while if NO, the CPU accomplishes steps S8 and S9 and proceeds to step S10. In step S5, timer T is set as T=T+0.04 sec, 0.04 sec depending on the operating time of the CPU. In step S6, whether or not timer T is longer than five seconds (T>5.0) is determined. If YES, the CPU proceeds to step S7, otherwise the CPU proceeds to step S10. In step S7, flag Fcut is set at 1 (Fcut=1). That is, in this particular embodiment, fuel feed to the engine is interrupted when the detected supercharging pressure P continues higher than 450 mmHg for five seconds.

After step S7, the CPU proceeds to S10 in which it is determined whether or not flag Fcut is zero. If NO, the CPU proceeds to step S11 in which the value $\tau$ of the width W of the fuel injection pulse is changed to zero ($\tau$=0), while if YES, the CPU proceeds directly to step S12. That is, when flag Fcut is zero (Fcut=0), the value $\tau$ of the width W of the injection pulse to be generated remains as it is determined in step S3. In step 13, it is determined whether or not it is the proper timing to inject fuel from the fuel injection valve 9. If YES, a fuel injection pulse having a width of is fed to the fuel injection valve 9. If NO, the CPU returns to step S2.

Figure 6:
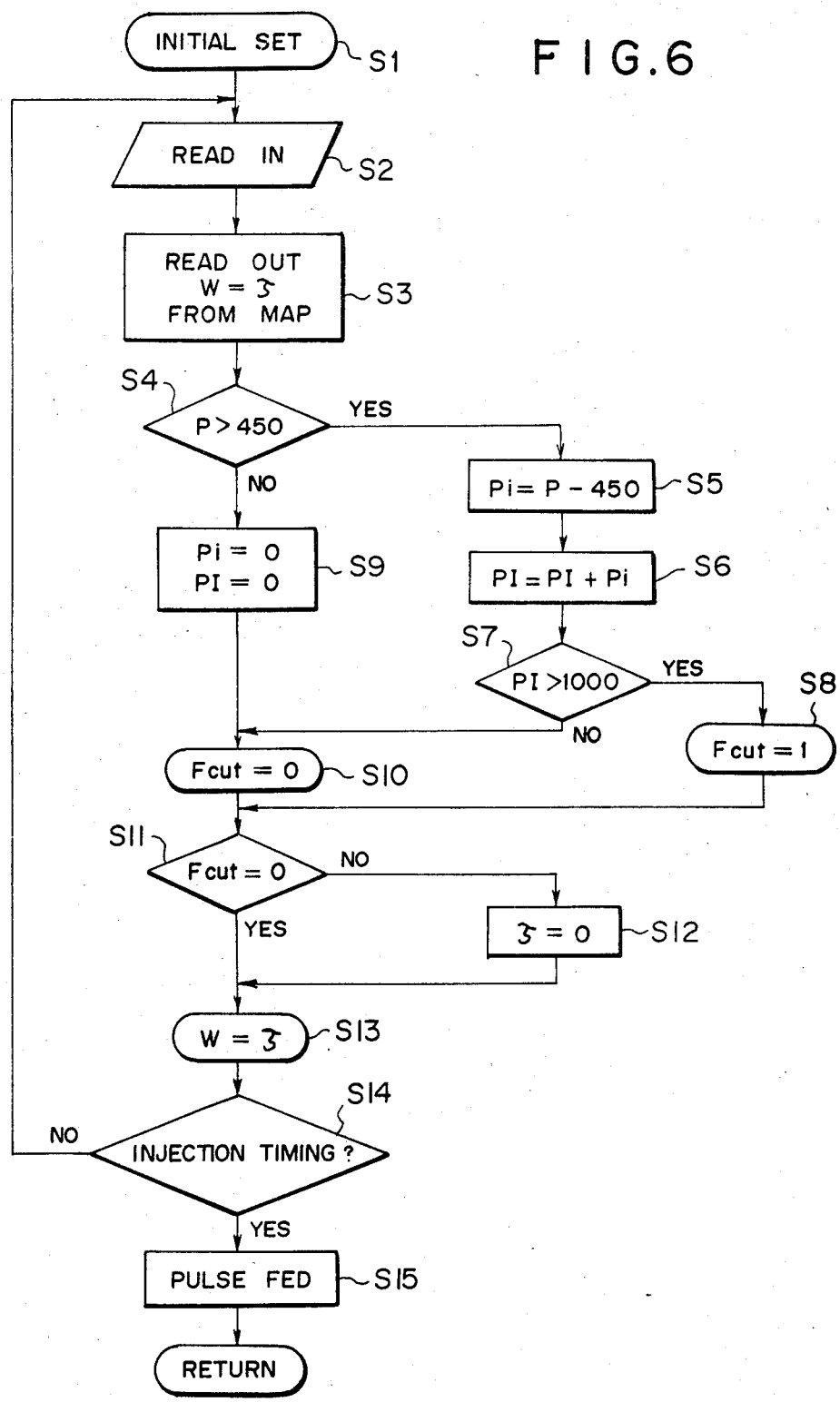
FIG. 6 shows another example of a flow chart for the operations to be carried out by the CPU of the microcomputer.

FIG. 6 shows another example of a flow chart indicating the operations to be accomplished by the CPU.

In step S1, flag Fcut is initially set at zero (Fcut=0). In step S2, the outputs of the sensors 8, 11 and 14 are read in, and then, in step S3, the width W of the fuel injection pulse to be generated is determined (W=$\tau$). In step S4, whether or not the detected supercharging pressure P is higher than the preset maximum supercharging pressure (450 mmHg) is determined. If NO, the CPU successively accomplishes steps S9 and S10 and proceeds to step S11, while if YES, the CPU proceeds to step S5. In step S5, the difference Pi between the detected supercharging pressure P and the preset maximum supercharging pressure (450 mmHg) is calculated (Pi=P−450). Then in step S6, the integrated value PI of the differences Pi is calculated (PI=PI+Pi). In the next step S7, the integrated value PI is compared with a predetermined threshold value (1000 in this particular example). When the integrated value PI is larger than the predetermined threshold value (PI>1000), the CPU sets flag Fcut at 1 (Fcut=1) and proceeds to step S11. When the integrated value PI is not larger than the predetermined threshold value, the CPU proceeds to step S11 via step S10. Steps S11 to S15 are the same as steps S10 to S14 in the flow chart shown in FIG. 5 and therefore will not be described here.

The flow chart shown in FIG. 6 is superior to that shown in FIG. 5 in that the time interval required to determine whether the protective devices should be actuated changes with increase in the detected supercharging pressure since the time interval required by the integrated value PI to reach the threshold value changes as the difference between the detected supercharging pressure P and the preset maximum supercharging pressure changes.

Though in the embodiment shown in FIG. 2, the pressure sensor 11 is disposed between the throttle valve 10 and the blower 5, it may be disposed downstream of the throttle valve 10 as shown by dashed line 11' in FIG. 2. Further, if desired, a pair of pressure sensors may be used, one between the throttle valve 10 and the blower 5, and the other downstream of the throttle valve 10.

What is claimed is:

1. A safety device for a turbocharged engine which is provided with a turbocharger compriing a turbine disposed in the exhaust passage and a blower disposed in the intake passage and connected with the turbine by way of a rotary shaft and in which the throttle valve is disposed in the intake passage downstream of the blower, said safety device comprising an engine protective means for controlling the maximum supercharging pressure in the intake passage, at least one pressure sensor for detecting the supercharging pressure downstream of the blower, and a control circuit which actuates said engine protective means when the supercharging pressure detected by the pressure sensor continues to be higher than a preset supercharging pressure for a predetermined time interval, said control circuit including means for generating said predetermined time interval, said means for generating said predetermined time interval shortening said time interval as the difference between the detected supercharging pressure and said preset supercharging pressure increases.

2. A safety device as defined in claim 1 in which said engine protective means comprises means for interrupting fuel feed to the engine and an alarm system.

3. A safety device as defined in claim 2 which further comprises means for simultaneously interrupting fuel feed to the engine when said alarm system is actuated.

4. A safety device as defined in claim 3 in which said alarm system is an alarm lamp.

5. A safety device as defined in claim 2 further comprising a waste gate valve which is disposed in the exhaust passage and permits a part of exhaust gas to flow bypassing the turbine when the supercharging pressure in the intake passage downstream of the blower exceeds a target supercharging pressure, thereby preventing the supercharging pressure from being increased over the target supercharging pressure, said preset maximum supercharging pressure being set higher than the target supercharging pressure.

6. A safety device as defined in claim 1 in which said pressure sensor is disposed in the intake passage between said blower and the throttle valve.

7. A safety device as defined in claim 1 in which said pressure sensor is disposed downstream of the throttle valve.

8. A safety device as defined in claim 1 in which a pair of pressure sensors are disposed one in the intake passage between the blower and the throttle valve and the other downstream of the throttle valve.

9. A safety device for a turbocharged engine which is provided with a turbocharger comprising a turbine disposed in the exhaust passage and a blower disposed in the intake passage and connected with the turgine by way of a rotary shaft and in which the throttle valve is disposed in the intake passage downstream of the blower, said safety device comprising an engine protective means for controlling the maximum supercharging pressure in the intake passage, at least one pressure sensor for detecting the supercharging pressure downstream of the blower, and a control circuit which actuates said engine protective means when the supercharging pressure detected by the pressure sensor continues to be higher than a preset supercharging pressure for a predetermiend time interval, wherein said control circuit repeatedly calculates the difference between the detected supercharging pressure and said preset suoercharging pressure and calculates the sum of the successive values of the difference between the detected supercharging pressure and said preset supercharging pressure, and actuates said engine protective means when the sum of the successive values reaches a predetermined threshold value.

10. A safety device as defined in claim 9 in which said engine protective means comprises means for interrupting fuel feed to the engine and an alarm system.

11. A safety device as defined in claim 10 in which said alarm system is an alarm lamp.

12. A safety device as defined in claim 10 further comprising a waste gate valve which is disposed in the exhaust passage and permits a part of exhaust gas to flow bypassing the turbine when the supercharging pressure in the intake passage downstream of the blower exceeds a target supercharging pressure, thereby preventing the supercharging pressure from being increased over the target supercharging pressure, said preset maximum supercharging pressure being set higher than the target supercharging pressure.

13. A safety device as defined in claim 10 in which said pressure sensor is disposed downstream of the throttle valve.

* * * * *

UNITED STATES PATENT AND TRADEMARK OFFICE
CERTIFICATE OF CORRECTION

PATENT NO. : 4,603,552

DATED : August 5, 1986

INVENTOR(S) : Yoshinobu Kido

It is certified that error appears in the above-identified patent and that said Letters Patent is hereby corrected as shown below:

On the title page assignee should read

-- (73)Assignee: Mazda Motor Corporation --.

Signed and Sealed this

Sixth Day of January, 1987

Attest:

DONALD J. QUIGG

Attesting Officer

Commissioner of Patents and Trademarks